United States Patent
Lenchik et al.

(10) Patent No.: US 7,239,898 B2
(45) Date of Patent: *Jul. 3, 2007

(54) SELF CONFIGURING MULTIPLE ELEMENT PORTABLE ELECTRONIC DEVICE

(75) Inventors: Vitaly Lenchik, Lake Zurich, IL (US); Casey Hill, Crystal Lake, IL (US); David Kilp, Colloyville, TX (US); Kevin Baker, Janesville, WI (US); John F. Jennings, Libertyville, IL (US)

(73) Assignee: Motorola, Inc., Schaumburg, IL (US)

( * ) Notice: Subject to any disclaimer, the term of this patent is extended or adjusted under 35 U.S.C. 154(b) by 429 days.

This patent is subject to a terminal disclaimer.

(21) Appl. No.: 10/675,786

(22) Filed: Sep. 30, 2003

(65) Prior Publication Data

US 2004/0067783 A1 Apr. 8, 2004

Related U.S. Application Data

(63) Continuation of application No. 09/560,977, filed on Apr. 28, 2000, now Pat. No. 6,658,272.

(51) Int. Cl.
*H04B 1/38* (2006.01)
*H04M 1/00* (2006.01)

(52) U.S. Cl. .............. 455/575.1; 455/90.3; 455/550.1; 455/556.2; 455/566

(58) Field of Classification Search .. 455/556.1–556.2, 455/575.1–575.4, 575.7, 90.3, 550.1, 128–129, 455/344, 346–349, 566, 557, 11.1, 95, 66.1; D14/188, 137–138, 140; 345/168–169, 1.1–1.3, 345/108, 214, 204–207, 649–659; 464/176–178; 439/104, 248, 278, 294, 307–313, 372, 460, 439/465–467

See application file for complete search history.

(56) References Cited

U.S. PATENT DOCUMENTS

| | | | |
|---|---|---|---|
| 4,086,519 A | 4/1978 | Persson | |
| 5,168,221 A | 12/1992 | Houston | |
| 5,278,779 A | 1/1994 | Conway et al. | |
| 5,332,965 A | 7/1994 | Wolf et al. | |
| 5,494,447 A * | 2/1996 | Zaidan | 439/31 |
| 5,625,673 A | 4/1997 | Grewe et al. | |
| 5,661,632 A | 8/1997 | Register | |
| 5,682,529 A | 10/1997 | Hendry et al. | |
| 5,933,783 A | 8/1999 | Kawakami et al. | |
| 6,009,336 A | 12/1999 | Harris et al. | |
| 6,658,272 B1 * | 12/2003 | Lenchik et al. | 345/164 |
| 6,781,824 B2 * | 8/2004 | Krieger et al. | 361/683 |
| 6,830,456 B2 * | 12/2004 | Obermeyer | 439/6 |
| 6,976,861 B2 * | 12/2005 | McWilliam et al. | 439/165 |
| 2004/0204059 A1 * | 10/2004 | Wong et al. | 455/556.1 |
| 2005/0148375 A1 * | 7/2005 | DeLine | 455/575.3 |

FOREIGN PATENT DOCUMENTS

WO WO 93/07680 4/1993

* cited by examiner

*Primary Examiner*—Meless Zewdu
(74) *Attorney, Agent, or Firm*—David S. Noskowicz (57) ABSTRACT

A self configuring multiple element portable electronic device (100) and method is provided. The device comprises at least a first electronic element (104) and a second electronic element (106) and a joint (112) connecting the first electronic element and the second electronic element, with the joint allowing movement in more than one plane of the first electronic element in relation to the second electronic element, wherein the self configuring multiple element portable electronic device is capable of self configuring an operational mode based on a relative position of the first electronic element with respect to the second electronic element. The method comprises the steps of detecting a relative position of the first electronic element relative to the second electronic element, and selecting an operational mode of the device based on the relative position.

23 Claims, 9 Drawing Sheets

FIG. 22

SELF CONFIGURING MULTIPLE ELEMENT PORTABLE ELECTRONIC DEVICE

This application is a continuation of application Ser. No. 09/560,977, filed 28 Apr. 2000 now U.S. Pat. No. 6,658,272.

BACKGROUND OF THE INVENTION

The present invention relates generally to portable electronic devices, and more particularly to portable electronic devices having multiple elements.

Many portable electronic devices exist that are designed for making life easier and more productive. Devices such as cellular phones, pagers, and personal digital assistants (PDAs) perform valuable functions such as communications, messaging, data storage and recall, etc.

These portable electronic devices often have two parts, a hinged cover having a display and a body having a keyboard. The display is typically chosen to match the intended purpose. For example, PDAs typically have a relatively large display, useful for displaying text and graphics. Cellular phones, on the other hand, typically have smaller displays designed for displaying a limited number of alphanumeric characters. This makes sense, as production costs may be kept down by including only the required capabilities in the device.

More and more, people find such portable electronic devices to be invaluable for keeping in touch with co-workers, family, and friends, and for organizing a busy lifestyle. As the demand for portable electronic devices increases, these devices tend to increase in functions, features, and complexity. However, such devices still tend to remain as distinct units due to the increased complexity and difficulty of use that often comes with integration of multiple devices.

Integration of multiple devices is understandably difficult, due to the need for providing different functions that inter-mesh operationally while sharing inputs, outputs, and other resources. This is further complicated by the need to create a device that is intuitively simple to use.

Non-integration of portable electronic devices produces several drawbacks. First, there are the obvious drawbacks such as needing multiple devices to accomplish all desired functions, along with the attendant size and weight inconvenience. Second, non-integration means that multiple devices have duplicate components, such as heavy and bulky displays, input devices, and power sources. Third, the increased use of microprocessors and their increasing capabilities allow devices to be developed that are flexible and can be configured to perform multiple functions. Fourth, integrating devices to share common components and to cooperatively function could provide increased value to consumers while reducing prices.

There remains a need in the art, therefore, for improvements in portable electronic devices.

BRIEF DESCRIPTION OF THE DRAWINGS

FIGS. 11–15 show various embodiments of a position sensor;

DETAILED DESCRIPTION OF THE PREFERRED EMBODIMENTS

A self configuring multiple element wireless portable electronic communication device is provided according to a first aspect of the invention. The device comprises at least a first electronic element and a second electronic element and a joint connecting the first electronic element and the second electronic element, with the joint allowing movement in more than one plane of the first electronic element in relation to the second electronic element, wherein the self configuring multiple element portable electronic device is capable of self configuring an operational mode based on a relative position of the first electronic element with respect to the second electronic element.

A self configuring multiple element wireless portable electronic communication device is provided according to a first aspect of the invention. The device comprises at least a first electronic element and a second electronic element, a shaft affixed to the first electronic element of the hand-held device and having at least two lengthwise electrical conductor elements separated by an electrical insulator material, a ball formed on an end of the shaft, and a socket formed on the second electronic element, the socket including a plurality of spring loaded contacts adapted to press against the ball, with the plurality of spring loaded contacts adapted to contact the at least two lengthwise electrical conductor elements and electrically communicate with the at least two lengthwise electrical conductor elements, wherein the ball and the socket allow movement in more than one plane of the first electronic element in relation to the second electronic element, and wherein the contacts form a sensor for detecting a relative position of the first electronic element relative to the second electronic element, and wherein the self configuring multiple element portable electronic device is capable of self configuring an operational mode based on a relative position of the first electronic element with respect to the second electronic element.

A method for self configuring an operational mode in a self configuring multiple element wireless portable electronic communication device having a first electronic element that may be moved in relation to a second electronic element is provided according to a third aspect of the invention. The method comprises the steps of detecting a relative position of the first electronic element relative to the second electronic element, and selecting an operational mode of the device based on the position.

Now turning to FIGS. 1–8 show a self-configuring multiple element wireless portable electronic communication device 100 having a first element 104 joined to a second element 106 by a joint 112. FIGS. 1–4 show a configuration sequence wherein the first element 104 and the second element 106 are manipulated to place the device 100 into a portrait configuration.

Figure 4:
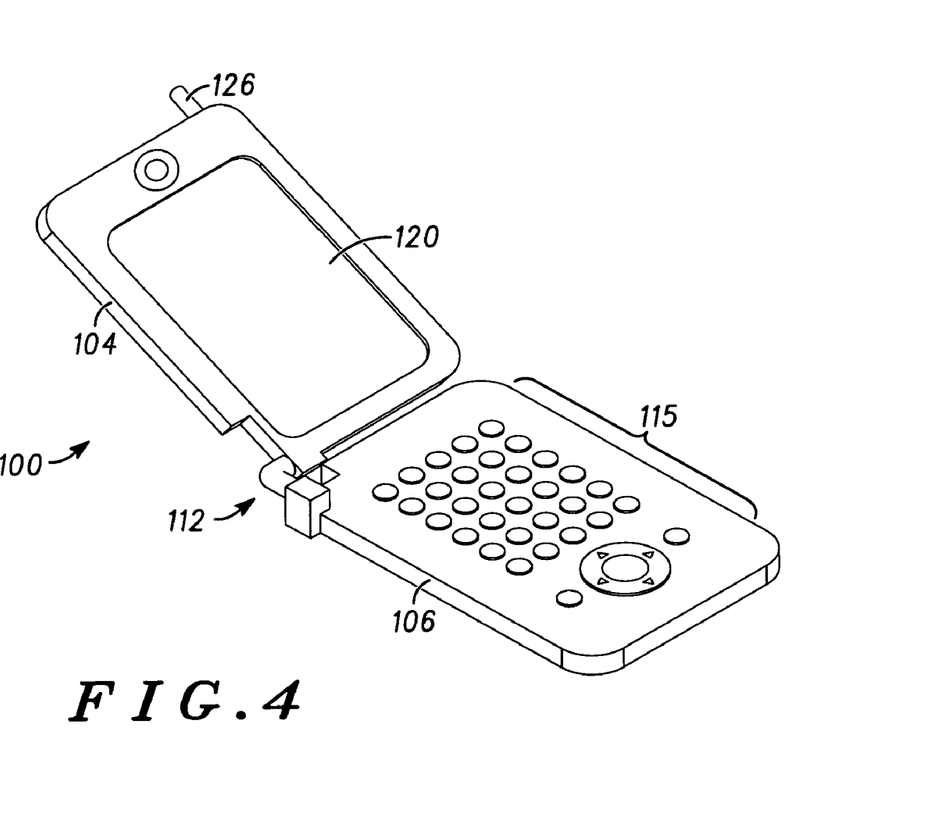
Figure 5:
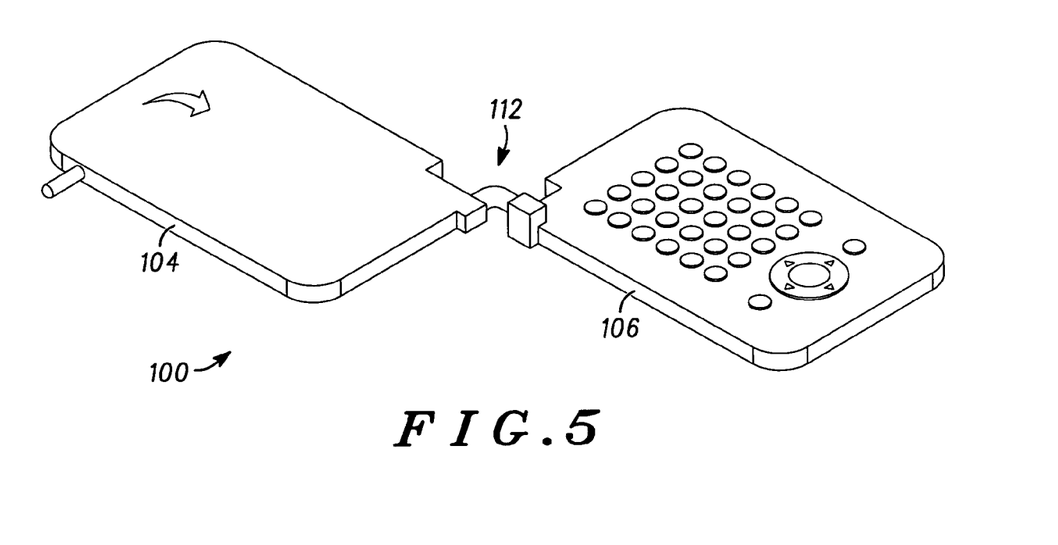
Figure 6:
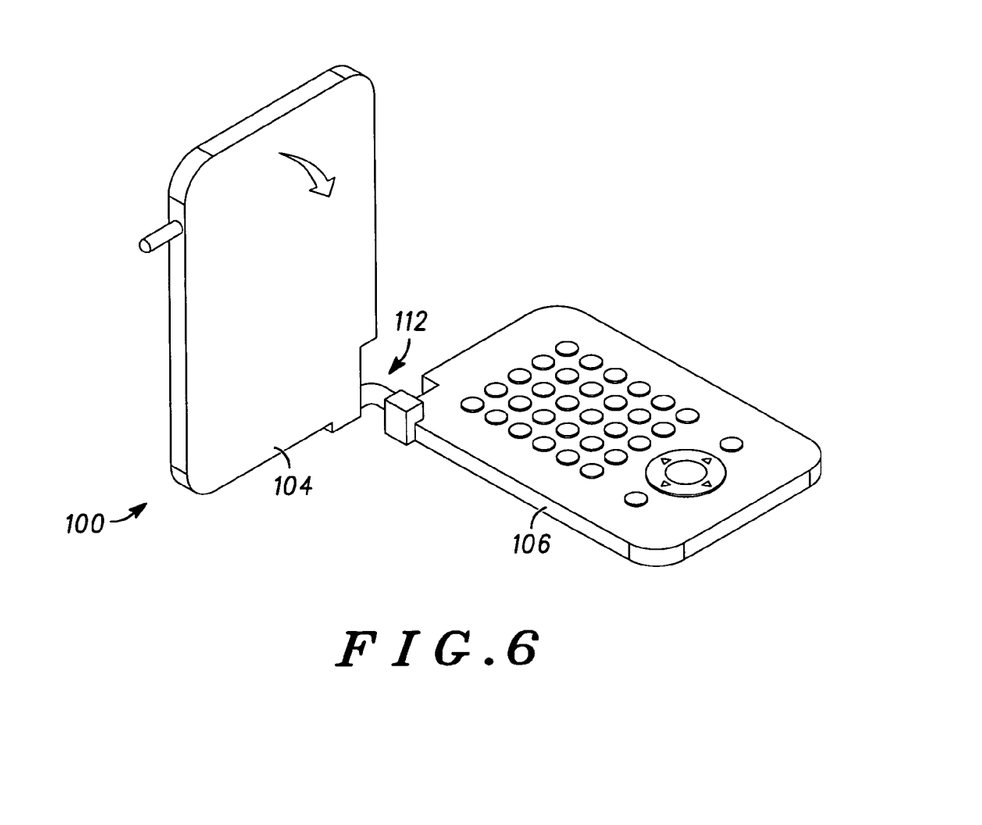

FIG. 4 shows a self-configuring device 100 when it is configured in a portrait configuration such as, for example, a cellular phone. A long dimension of the typically rectangular display 120 is vertically (or longitudinally) positioned when in use. Because the display 120 is therefore positioned like a portrait of a person, it is known as a portrait mode. The portrait configuration is also reflected in the inputs 115 of the second element 106, which may be configured to reflect the portrait mode and may include numeric keys and other phone keys. The first element 104 may be rotated down to a closed position parallel to and in contact with the second element 106 to assume a closed configuration (not shown). This is typical of a cellular phone wherein a body and a lid may be folded together and closed during non-use.

FIGS. 5–8 show a configuration sequence wherein the first element 104 and the second element 106 are manipulated to place the device 100 into a landscape configuration.

Figure 8:
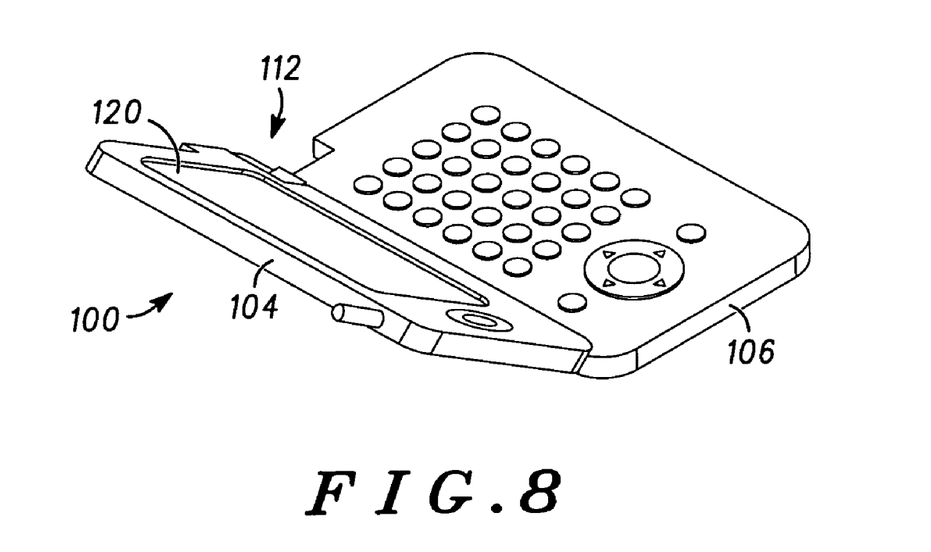

FIG. 8 shows the self-configuring multiple element portable electronic device 100 in a landscape configuration, such as, for example, a pager. In the landscape configuration, the display 120 has the long dimension in a substantially lateral position, as is the second element 106. This may also be appropriate for a device such as a PDA or other electronic appliances. Again, the first element 104 may be rotated down to a closed position parallel to and in contact with the second element 106 to assume a closed configuration (not shown).

Figure 9:
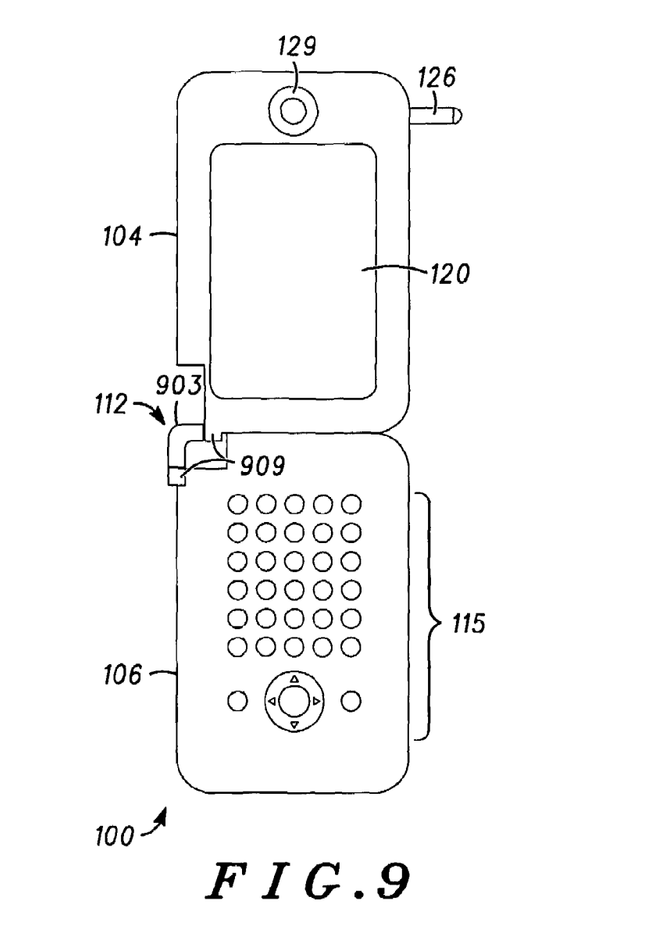
FIG. 9 shows various input and output devices and other features.

Referring now to FIG. 9, the various input and output devices and other features are discussed. In a typical configuration, the first element 104 contains a display 120. The display 120 may be any common display device, such as an LCD screen, a fluorescent display, a TFT display, or a CRT, for example. The display 120 in a cellular phone type configuration may be used to display phone related functions such as name and number storage, speed dial information, or phone control and operation settings, for example. In pager or PDA type operational modes, the display 120 may be used to provide a variety of graphics, images, text, or combinations thereof. The orientation of the display 120 may be self configured by the device 100 to match the overall orientation of the self-configuring multiple element portable electronic device 100.

Also included in the first element 104 may be an antenna 126 and a camera 129. The camera 129 is preferably a video camera, but alternatively may be a still digital camera. The antenna polarization may be modified to reflect the configuration (i.e., a horizontal polarization in the portrait mode and a vertical polarization in the landscape mode, for example).

The second element 106 may contain inputs 115 such as, for example, a keyboard. Alternatively, other input devices (not shown) may include a pointing device such as a joystick and buttons used on laptop or notebook computers, a track ball, a touch pad, a rocker switch, a touch screen, a TTY input device for disable persons, a braille key input, or a pad for handwriting pen, for example. The orientation of the inputs 115 will be self configured to match the overall orientation of the self-configuring multiple element portable electronic device 100.

The joint 112 joins the first element 104 to the second element 106 and allows the first element 104 to move with respect to the second element 106. This movement may be in two planes, unlike a typical cellular phone which consists of a body with a hinged cover that moves in only one plane.

Although the present invention is shown as having only two elements, it should be understood that the present invention also applies to portable electronic devices having three or more elements. In such cases, multiple joints 112 may be employed.

The joint 112 may optionally include one or more detents wherein a detent position provides a bias to hold the first element 104 in a predetermined position in relation to the second element 106. Two such detents are preferably located to provide the relative positions shown in FIGS. 4 and 8.

It can be seen from the figures that the joint 112 allows the first element 104 and the second element 106 to move with respect to each other, allowing various positions of the two elements. The joint 112 of the present invention also allows the device 100 to sense the relative positions of the first element 104 and the second element 106. Because of this ability to determine the relative positions, both the display device 120 and the inputs 115 may be configured by the portable electronic device 100 into either a landscape mode or a portrait mode.

In addition to the changing of the orientation of displayed graphics or text, the orientation and arrangement of the individual keys or input elements of the inputs 115 may also be modified. For example, in a portrait (cellular phone) mode the input keys may be arranged so that they are properly oriented when the portable electronic device 100 is in a vertical portrait position (see FIG. 4). In the landscape mode, the first element 104 and second element 106 are substantially parallel and horizontally positioned, and the input keys may be configured in a horizontal orientation (see FIG. 8).

Figure 1:
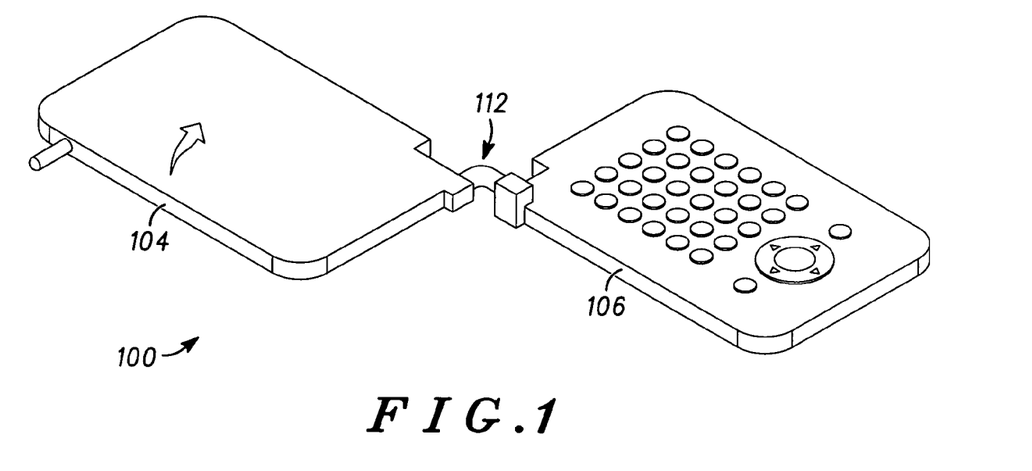
FIGS. 1–8 show a self-configuring multiple element wireless portable electronic communication device having a first element joined to a second element by a joint.
Figure 2:
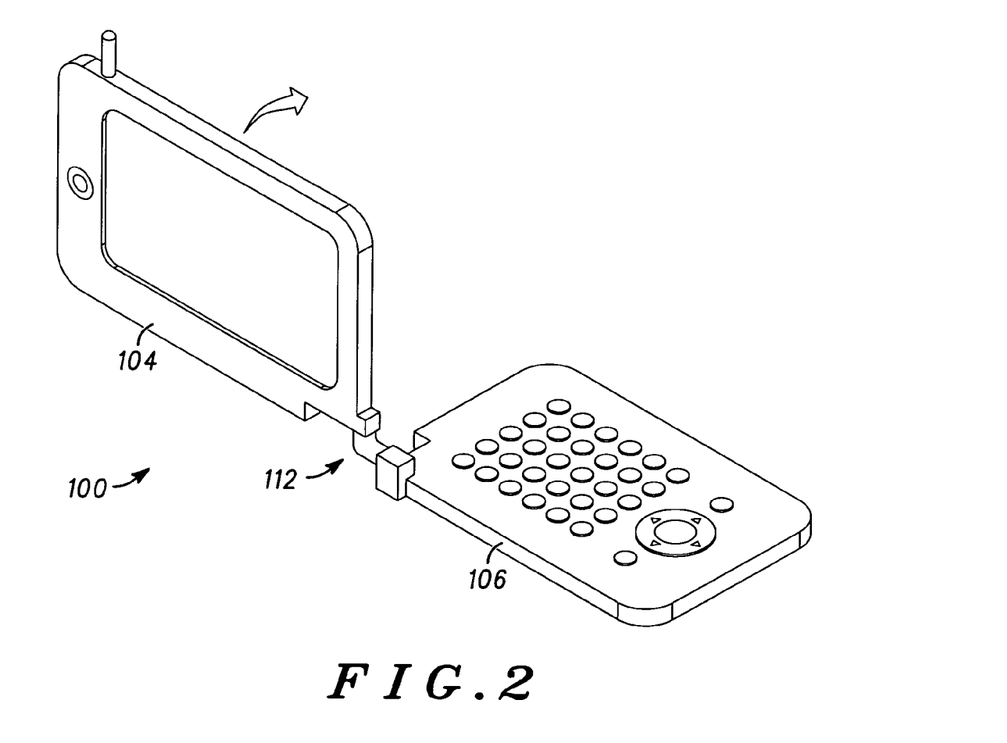

Although FIGS. 1–8 show both configurations starting from a similar initial configuration, it should be noted that the device 100 may be directly manipulated from one configuration to the other, without necessarily having to proceed to the configuration shown in FIG. 1.

The input keys may be reoriented by simply including multiple symbols or characters on each key (oriented in both portrait and landscape positions). Alternatively, the inputs 115 may include a touch-screen display that is capable of reconfiguring and reorienting the touch input regions and accompanying symbols and characters. A third alternative is the use of controllable backlighting, wherein symbols or characters are variably illuminated in a translucent or transparent input element or key. A fourth alternative is the use of electronic labels which contain symbols or characters that can be reconfigured and reoriented.

Likewise, other input and output devices, such as the camera 129 or an electronic handwriting tablet for use with a handwriting stylus, for example, may be self configured by the relative positions of the first element 104 and the second element 106. In addition the operation of the input device must have the proper orientation. Handwriting recognition software must know whether the handwriting tablet is in a landscape or portrait positions. The same is true for joysticks and other similar devices.

As an additional feature, the relative positions of the elements may also select a service to be received. For example, the user may position the two elements 104 and 106 to cause the portable electronic device 100 to self configure as a cellular phone and receive incoming phone calls. The portable electronic device 100 may include an alert that notifies the user that a non-selected service is waiting to be received, such as an incoming page in this example. The user may therefore reposition the elements of the device 100 in order to cause the device 100 to self configure as a pager, whereupon the incoming page may be received and/or responded to.

As a further feature, altering the operational configuration and mode of the device 100 may be useful in conserving battery life. Some operational modes, chosen by the user, may consume less battery life, given screen activity, screen size, or non real-time synchronous message versus real-time messaging (i.e., paging versus telephony). The operation modes may also dictate different reverse channel transmit power levels, also allowing for battery life conservation.

Figure 3:
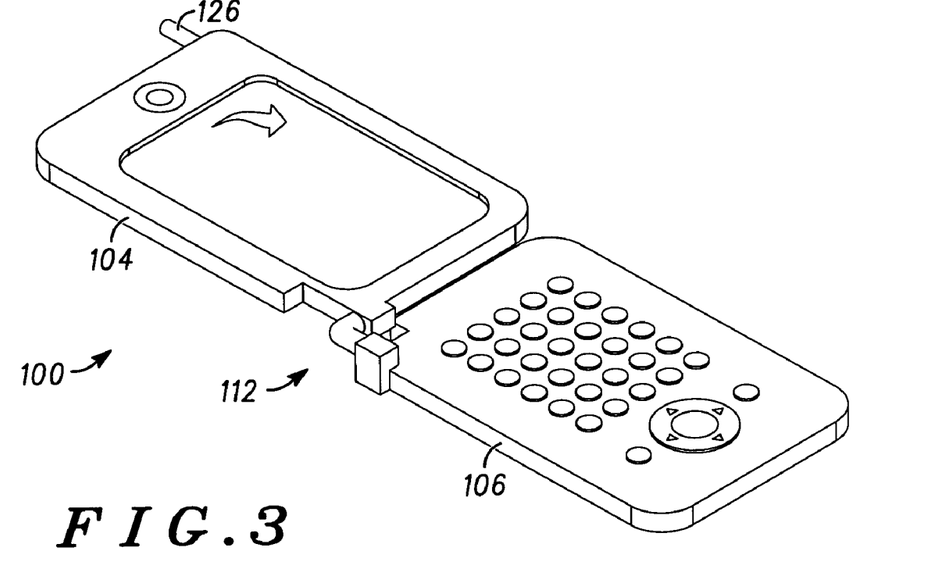
Figure 7:
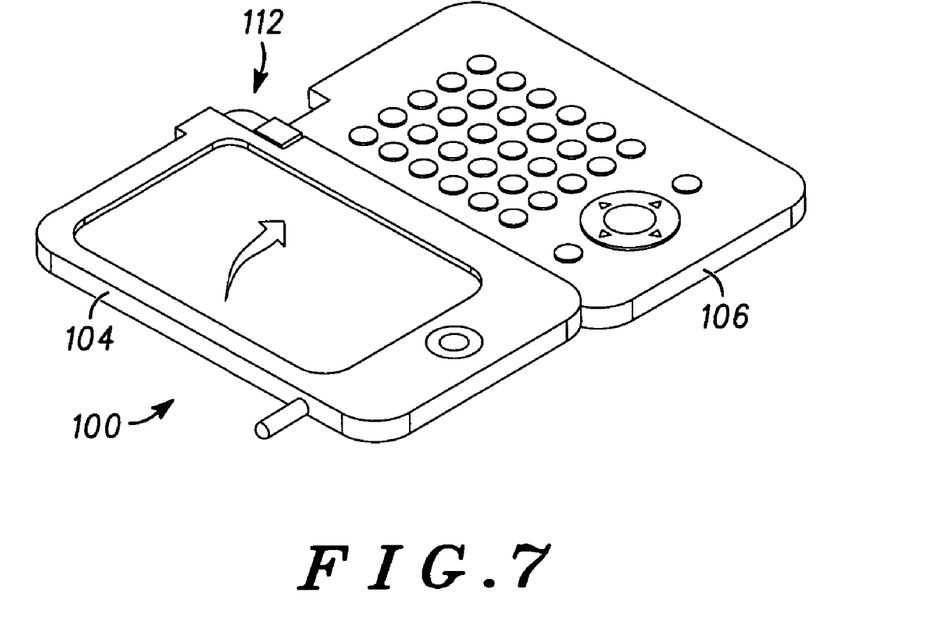

Still further, altering the configuration and operation mode of the device results in the need to align the antenna for optimum RF operation, typically in a vertical polarization. As shown in FIG. 7, when the device is configured in a landscape orientation the antenna will need to be in a first position extending the antenna in a optimum RF polarization as the device is operated by the user. FIG. 3 shows operation of the device configured in a portrait orientation, such as a cellular phone.

FIG. 9 shows detail of a first embodiment of the joint 112 of the present invention. The joint 112 includes a first fixed element 909 attached to the first electronic element 104, a second fixed element 909 attached to the second electronic element 106, and a connector element 903. The connector element 903 rotatably attaches to and connects the two fixed elements 909, and allows the first electronic element 104 to rotate in two planes with respect to the second electronic element 106.

Figure 10:
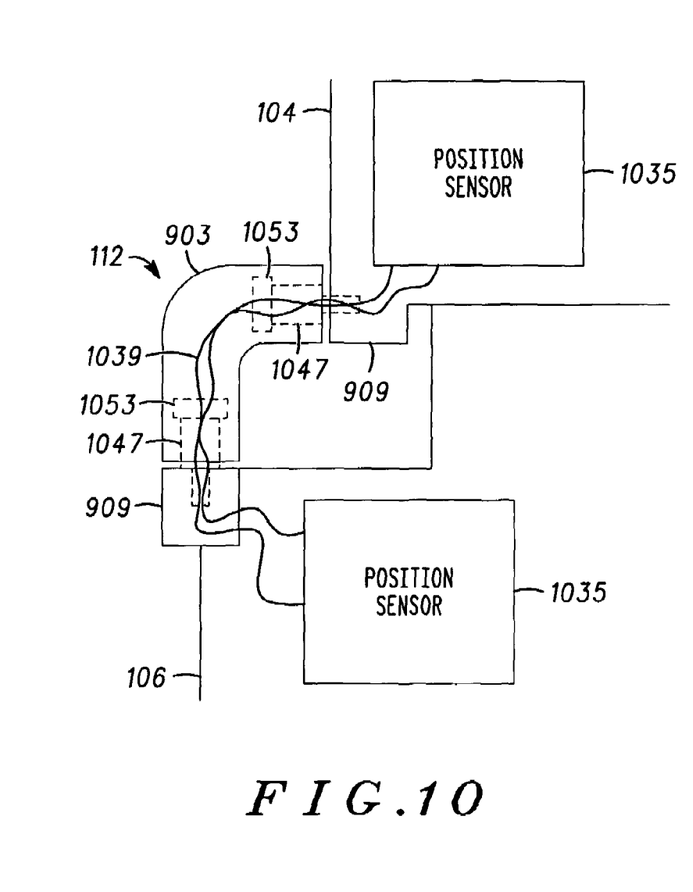
FIG. 10 shows a first joint embodiment along with a positional sensor device arrangement.

FIG. 10 shows the first joint embodiment along with a positional sensor device arrangement. Exemplary fixed elements 909 include a shaft 1047. A fixed element 909 is affixed to the first and second electronic elements 104 and 106, while the shaft 1047 is adapted to fit rotatably within an opening in the connector element 903. The fixed elements 909 (or the connector element 903) may include a retainer device, such as the ridge or ring 1053, for example, that allows the components to securely snap together.

The joint 900 may include one or more positional detents. This may be a ridge (not shown) on the shaft 1047 which may interact with grooves, etc., in the connector element 903 to provide fixed positional detents.

The fixed elements 909 each contain positional sensor devices (discussed below in conjunction with FIGS. 11–13) that interact with the connector element 903. The positional sensor devices are each connected to corresponding position sensor circuit boards 1035, and are therefore capable of determining a relative rotational position of each electronic element with respect to the connector element 903. When possessing data from both positions sensors and both position sensor circuit boards 1035, the portable electronic device 100 can determine a relative position of the first electronic element 104 with respect to the second electronic element 106.

Also shown in the figure is a bus 1039. The bus 1039 may pass through a hollow interior of the fixed elements 909 and a hollow interior of the connector element 903, and may be a single wire or lead, or a plurality of wires or leads. A positional information from a position sensor may be transmitted over the bus 1039. In addition, the bus 1039 may conduct electrical power between the electronic elements. Alternatively, the data bus 1039 may be external to the three joint components.

Figure 11:
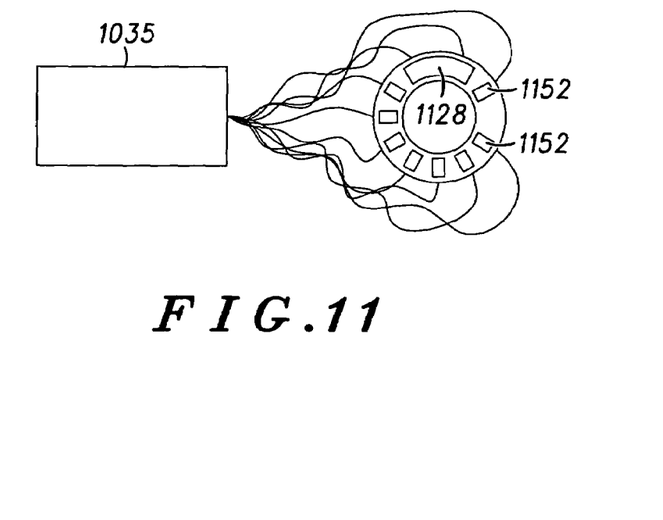
Figures 12, 13:
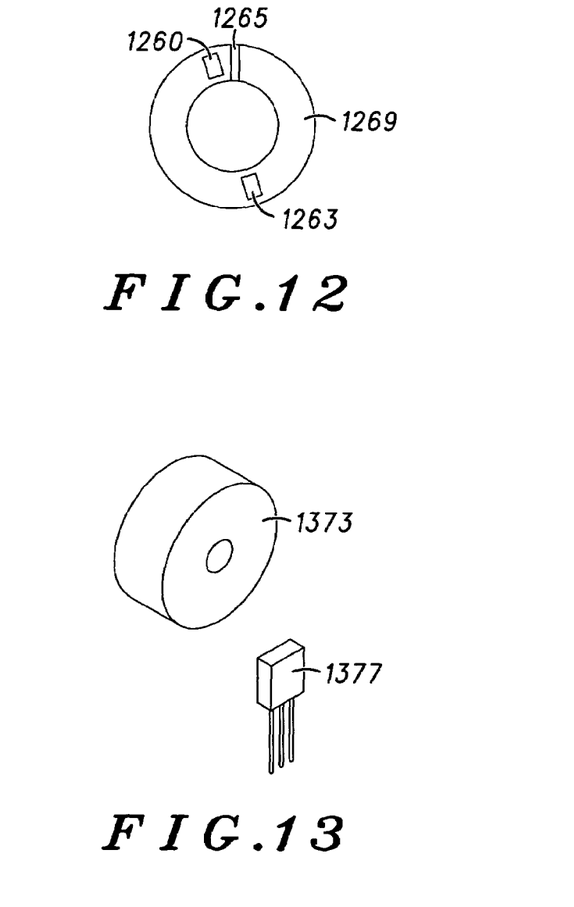

FIGS. 11–13 show various embodiments of the position sensor 932. FIG. 11 shows a first sensor embodiment wherein a face of a fixed element 909 may include a plurality of position sensor contacts 1152. A contact 1128 on the connector element 903 (only the contact 1128 is shown for clarity) may bridge pairs of position sensor contacts 1152, giving the corresponding position sensor circuit board 1035 a closed electrical circuit that may be used to determine a relative position of an electronic element 104 or 106. Due to the design of this sensor embodiment, only one pair of position sensor contacts 1152 may form a closed circuit at any time.

FIG. 12 shows a second sensor embodiment, wherein the position sensor comprises a variable resistor. The position sensor includes a fixed contact 1260, a resistive surface 1269, and a gap 1265 in the resistive surface 1269, all formed on a fixed element 909. A moving contact 1263 is affixed to the connector element 10003 (the connector element 903 is not shown for clarity). In use, the moving contact 1263 may rotate on the position sensor as the corresponding electronic element is moved. It should be understood that a wire or other lead must therefore extend from the moving contact 1263 to the position sensor circuit board 1035 (not shown). The resistance received by a corresponding position sensor circuit board 1035 will therefore vary according to the rotation of the position sensor.

The above description places the variable resistor on a fixed element 909. However, the variable resistor could alternatively be formed on an end of the connector element 903, with the moving contact 1263 being formed on a fixed element 909.

FIG. 13 shows a third sensor embodiment, wherein the position sensor comprises a magnet 1373 and a Hall Effect sensor 1377. The magnet 1373 is preferably affixed to an end of the connector element 903, and the Hall Effect sensor 1377 is affixed to or embedded in a fixed element 909. The magnet 1373 may be comprised of multiple magnetic north and south poles, and may be comprised of multiple magnets or magnetic poles of different strengths and orientations.

The Hall Effect sensor 1377 generates an electrical signal when in a magnetic field. The corresponding position sensor circuit board 1035 may use this electrical signal to determine a relative position.

Figure 14:
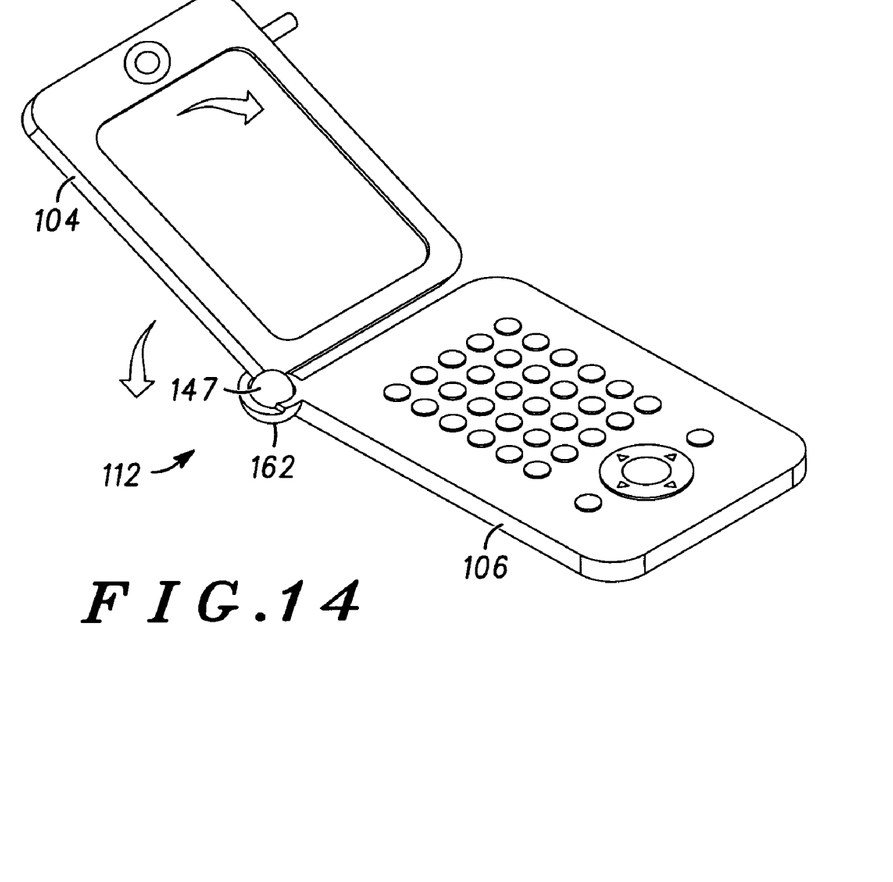
FIGS. 14-15 show a second embodiment of the joint.
Figure 15:
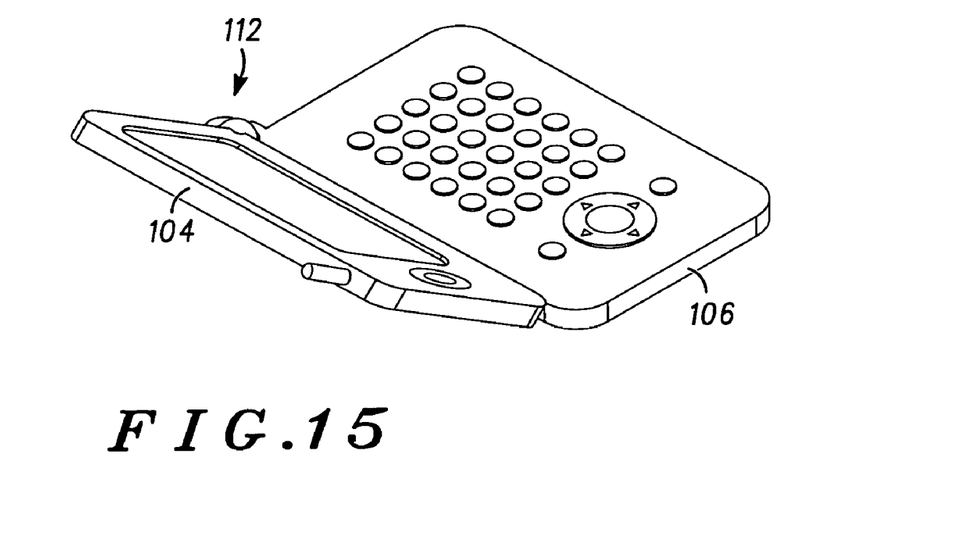

FIGS. 14–15 show a second embodiment of the joint 112. In the second embodiment, the joint 112 is a ball type joint having a ball 147 attached to either the first or second elements. In a preferred embodiment, the ball 147 is attached to the first element 104. The ball 147 may optionally include a shaft 137 (see FIG. 20). The ball 147 is rotatably received in a socket 162 formed in the second element 106. The joint 112 therefore allows movement of the first element 104 in two planes in relation to the second element 106.

Figure 16:
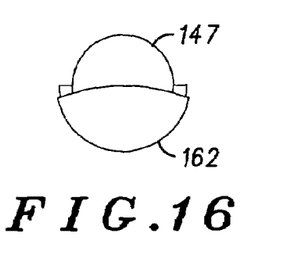
FIGS. 16–18 show detail of a socket of the second embodiment.
Figure 17:
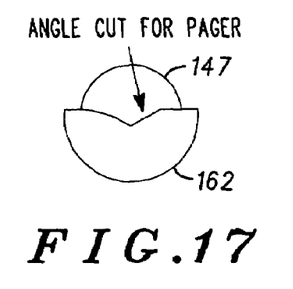
Figure 18:
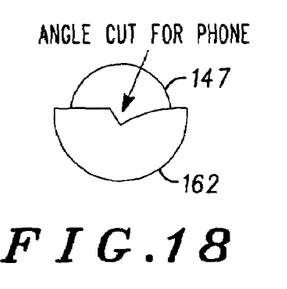

FIGS. 16–18 show detail of the socket 162. FIGS. 17 and 18 are views of FIG. 16 but from left and right sides, showing angle cuts (detents) designed to hold the two elements in predetermined positions for portrait and landscape configurations.

Figure 19:
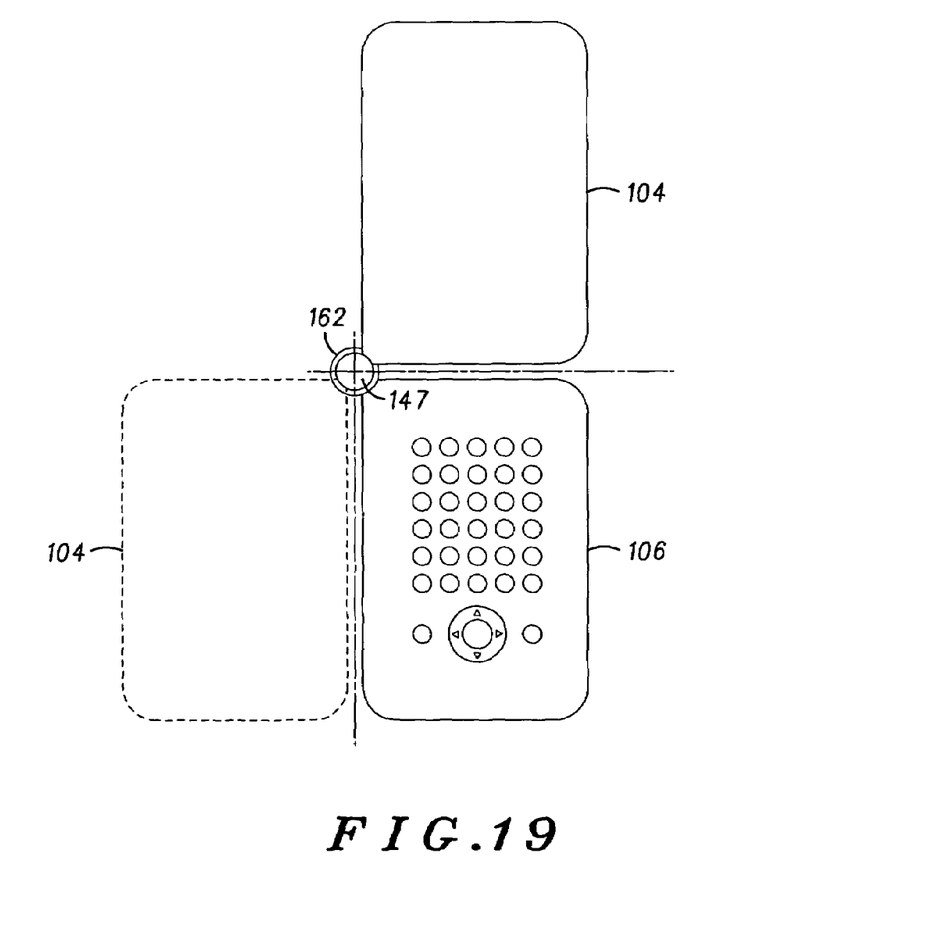
FIG. 19 shows two resulting predetermined positions of detents of the second embodiment.

FIG. 19 shows the two resulting predetermined positions of the first element 104 in relation to the second element 106.

Figure 20:
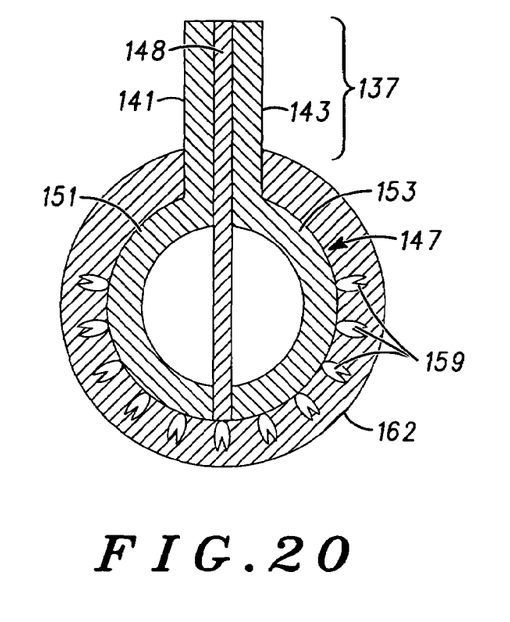
FIG. 20 shows detail of the ball and the socket of the second embodiment.

FIG. 20 shows detail of the ball 147 and the socket 162. The ball 147 comprises at least two conductors 151 and 153, although more than two conductors could be employed. The two conductors 151 and 153 are separated by a strip of electrically insulating material 148. The optional shaft 137 also includes conductive regions 141 and 143, with the conductive regions 141 and 143 ending in the conductors 151 and 153 of the ball 147. A voltage potential may be placed across the two conductive regions 151 and 153 of the ball 147. A plurality of contacts 159 in the socket 162 press against the ball 147 in a spring-like fashion, and conduct electricity between the ball 147 and the second element 106. The plurality of contacts 159 may therefore be used to sense the position of the first element 104 in relation to the second element 106 by determining which contacts of the plurality of contacts 159 are conducting electricity. The conductive regions and the contacts therefore allow the portable electronic device 100 to sense the relative position by determining which contact(s) receives the voltage of conductor 151 and which contact(s) receives the voltage of conductor 153. The positional measurement resolution may be determined by the relative sizes (and numbers) of the conductive regions 151 and 153 of the ball 147, and also by the size, number, and placement of contacts 159.

Not only is the relative position sensed, but also electrical power may be transferred between the first element 104 and the second element 106 via the various embodiments of the joint 112. This is desirable because a power source is preferably located in only one of the two elements 104 or 106.

When the ball 147 is rotated, it may be possible that conductors 151 and 153 may be connected together, creating a short circuit. This may be prevented by the inclusion of a current sensing device that shuts down electrical power to the conductors 151 and 153 when a short circuit is detected. When the short circuit is removed, (i.e., the ball 147 is rotated further), the current sensing device may re-apply power.

A further advantage of the ball joint socket and associated contacts is that a two-way digital communication may be performed through the joint 112. This two-way electrical communication may be accomplished by superimposing a digital signal on top of the DC power voltage level (electrical power) existing across the conductive elements 151 and 153 of the joint 112.

Figure 21:
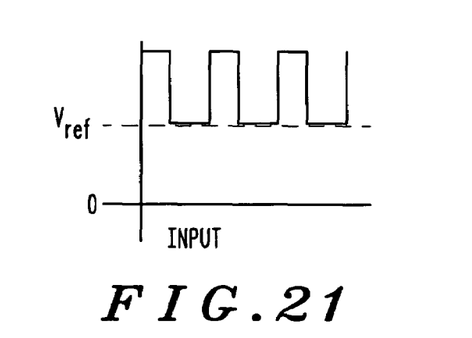
FIG. 21 shows a graph of a communication signal superimposed on a power voltage.
Figure 22:
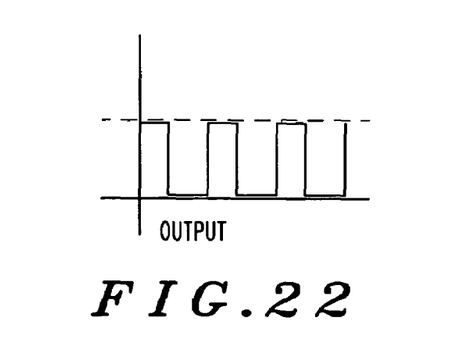
FIG. 22 shows a digital communication signal removed from the power voltage.

FIG. 21 shows a graph of a communication signal superimposed on the power voltage, while FIG. 22 shows the digital communication signal removed from the power voltage. The communication signal may be removed from the power voltage after the ball joint by using a capacitor to remove the DC component, leaving only the communications signal.

While the invention has been described in detail above, the invention is not intended to be limited to the specific embodiments as described. It is evident that those skilled in the art may now make numerous uses and modifications of and departures from the specific embodiments described herein without departing from the inventive concepts.

We claim:

1. A handheld portable electronic communication device, comprising:
    a first housing element;
    a second housing element;
    a first pivoting member coupled to the first housing element, the first pivoting member having a first axis of rotation across an upper portion of the first housing element;
    a second pivoting member coupled to the second housing element and the first pivoting member, the second pivoting member having a second axis of rotation substantially perpendicular to the first axis; and
    the first housing element rotatable about the first axis from a first configuration wherein the first housing element overlays the second housing element to a second configuration wherein the first housing element and the second housing element are angularly displaced about the first axis, and
    the first housing element rotatable relative to the second housing element about the second axis.

2. The device of claim 1, wherein the second pivoting member is coupled to a side portion of the second housing element and the second axis is parallel to the side portion of the second housing element.

3. The device of claim 2, wherein the first pivoting member and the second pivoting member are coupled together by an elbow.

4. The device of claim 1, wherein the second hinge allows the first housing element to rotate relative to the second housing element about the second axis from the first configuration to a third configuration wherein the first housing element and the second housing element are angularly displaced about the second axis.

5. The device of claim 4, wherein the first housing element rotates to either the third configuration or the second configuration from the first configuration.

6. The device of claim 4, wherein the first housing element rotates relative to the second axis from the first configuration to the second configuration or the first housing element rotates relative to the first axis from the first configuration to the third configuration.

7. The device of claim 4, wherein the device automatically configures a first operation mode when the first housing element is rotated to the second configuration relative to the second housing element, and wherein the device automatically configures a second operation mode when the first housing element is rotated to the third configuration relative to the second housing element.

8. The device of claim 7, wherein the device further comprises a display disposed in the first housing element or the second housing element,
    wherein the display is configured in a portrait orientation when the device is in the first configuration and
    wherein the display is configured in a landscape orientation when the device is in the second configuration.

9. The device of claim 8, the first pivoting member pivotable only about the first axis, the second pivoting member pivotable only about the second axis.

10. The device of claim 1, wherein the second pivoting member is coupled to the first pivoting member at a point between a first end of the first pivoting member and a second end of the first pivoting member.

11. The device of claim 10, wherein the second pivoting member is coupled to the first pivoting member at a mid point between the first end and the second end of the first pivoting member.

12. The device of claim 11, wherein the first housing element rotates about the first pivoting member and the second pivoting member to a fourth configuration wherein the first housing element overlays the second housing element such that the first housing element is rotated substantially 180 degrees from the first configuration.

13. The device of claim 12, wherein the device automatically configures a first operation mode when the first housing element is rotated to the second configuration relative to the second housing element, and
    wherein the device automatically configures a second operation mode when the first housing element is rotated to the fourth configuration relative to the second housing element.

14. The device of claim 12, wherein the device in the first configuration encloses a user interface component in-between the first housing element and the second housing element, and
    wherein the user interface component is not enclosed in-between the first housing element and the second housing element in the fourth configuration.

15. A self configuring multiple element wireless portable electronic communication device, comprising:
   at least a first element and a second element; and a joint connecting the first element and the second element, the joint allowing movement in more than one plane of the first element in relation to the second element,
   wherein the joint couples the first electronic element to the second electronic element such that the device configures to at least a portrait configuration and a landscape configuration,
   wherein the first element rotates relative to the second element from a first closed configuration wherein the first element overlays the second element to the portrait configuration, and
   wherein the first element rotates relative to the second element from the first closed position to the landscape configuration, and
   wherein the self configuring multiple element portable electronic device is capable of self configuring an operational mode based on a relative position of the first element with respect to the second element.

16. The device of claim 15, wherein the first element includes a display device capable of being configured as a landscape display device and a portrait display device, and
   wherein the second element includes at least one input device having a plurality of input elements, the plurality of input elements capable of being configured as a landscape input device and a portrait input device, and
   wherein the movement configures a display device orientation and an input device orientation.

17. The device of claim 15, wherein the device has at least two operational modes and wherein the device self configures an operational mode based on a position of the first element relative to the second element.

18. The device of claim 17, wherein the display device is selected from the group including a LCD, a CRT, a fluorescent display, a Braille output device, a TFT display, and a touch screen display;
   wherein the display device is configured as a portrait display device when the first electronic element is configured as a portrait display device, and
   wherein the display device is configured as a landscape display device when the second electronic element is configured as a landscape display device.

19. The device of claim 17, wherein the input device is selected from the group including a keyboard, a joystick, a pointing device, a trackball, a touch pad, a rocker switch, a TTY input device, a Braille input device, a camera, a digital handwriting tablet, a pointing device, and a touch screen display,
   wherein the input device is configured as a portrait input device when the second element is configured as a portrait input device,
   wherein the input device is configured as a landscape input device when the second element is configured as a landscape input device.

20. The device of claim 19, wherein the input device orientation is configured to a landscape input device to accommodate at least a full text keyboard, and as a portrait input device to accommodate at least a digital handwriting tablet or a phone keyboard.

21. A handheld portable electronic communication device, comprising:
   a first housing portion;
   a second housing portion; and
   a joint interconnecting the first and second housing portions,
   the joint having a first pivot member coupled to one of the first and second housing portions, the joint having a second pivot member coupled to the other of the first and second housing portions,
   the first pivot member disposed along a first pivot axis and the second pivot member disposed along a second pivot axis perpendicular to the first pivot axis.

22. The device of claim 21, the first pivot member pivotable only about the first pivot axis, the second pivot member pivotable only about the second pivot axis.

23. The device of claim 21, the pivot axis of one of the first and second pivot members disposed across an upper portion of one of the housing portions.

* * * * *